United States Patent [19]
Tsai

[11] Patent Number: 5,298,882
[45] Date of Patent: Mar. 29, 1994

[54] LED DISPLAY COLLISION WARNING CIRCUIT FOR VEHICLES

[76] Inventor: Ching-Yuan Tsai, No. 3, Alley 3, Lane 246, Hsin Min Rd., Taipei, Taiwan

[21] Appl. No.: 21,019

[22] Filed: Feb. 22, 1993

[51] Int. Cl.$^5$ .............................................. B60Q 1/26
[52] U.S. Cl. ................................... 340/468; 340/435; 340/467; 340/479
[58] Field of Search ............... 340/479, 468, 464, 467, 340/478, 435

[56] References Cited
U.S. PATENT DOCUMENTS

| | | | |
|---|---|---|---|
| 4,712,044 | 12/1987 | Phillips | 340/478 X |
| 4,972,173 | 11/1990 | Raciti | 340/468 X |
| 5,166,672 | 11/1992 | Duneau | 340/479 X |

*Primary Examiner*—Hezron E. Williams
*Assistant Examiner*—Christine K. Oda
*Attorney, Agent, or Firm*—Morton J. Rosenberg; David I. Klein

[57] ABSTRACT

An LED display collision warning circuit for vehicles is provided. This circuit causes an LED display installed at tail of a vehicle to show warning indications. The LED display has six lamps which group into three display units with each unit consisting of two laterally symmetrically positioned lamps. These three display units show different warning indications in response to signals from a door-actuated circularly lighting and extinguishing circuit, a brake-actuated alternately flashing circuit, or a headlight-actuated night distance detection circuit so as to effectively prevent collisions and accidents.

3 Claims, 2 Drawing Sheets

LED DISPLAY COLLISION WARNING CIRCUIT FOR VEHICLES

BACKGROUND OF THE INVENTION

1. Field of the Invention

The present invention relates to a multi-functional collision warning circuit for vehicles and more particularly to a special control circuit which when used together with an LED display capable of showing changeable patterns and rear mounted on vehicles, produces different indications at the time a vehicle door is opened, the brake is actuated, or the headlights are turned on. The display pattern of the LED display may also change with different distances between the vehicle having the warning circuit mounted thereon and a vehicle behind it.

2. Prior Art

When driving at night, it is usually more difficult to judge the distance between one vehicle and another ahead of it due to insufficient road brightness that inevitably increases the dangers in traffic. Currently a tail lamp is added to a vehicle to indicate the braking and stop states of a vehicle so as to warn a vehicle approaching from the rear. However, such tail lamps are turned on or off depending only on the braking state of the vehicle without any significant eye-catching effect and therefore such requires improvement. Up to the present time there is no system designed to warn a vehicle approaching from the rear as to a door opening state of another vehicle. Additionally, there is not any system for warning the driver of the rapidly decreasing distance between the vehicle and the approaching vehicle. Thus, the subject concept has been developed to provide a multi-functional vehicle collision warning circuit to improve the shortcomings existing in the prior warning systems and lamps of vehicles.

SUMMARY OF THE INVENTION

The primary object of the present invention is to provide an LED display which is added to the rear of a vehicle and may provide continuous light, extinguish, or flash intermittently in different ways or patterns to respond to the brake and/or door opening states of a vehicle.

Another object of the present invention is to provide a light sensing means which may automatically detect the distance between the vehicle and an approaching vehicle during the night.

A still further object of the present invention is to provide a light sensing means in which the indication manner may vary with different distances between the vehicles and thereby positively and effectively warn the approaching vehicle of the decreasing distance between the two vehicles.

BRIEF DESCRIPTION OF THE DRAWINGS

FIG. 1 a block diagram of the circuit of the present invention; an

DETAILED DESCRIPTION OF THE PREFERRED EMBODIMENTS

Figure 1:
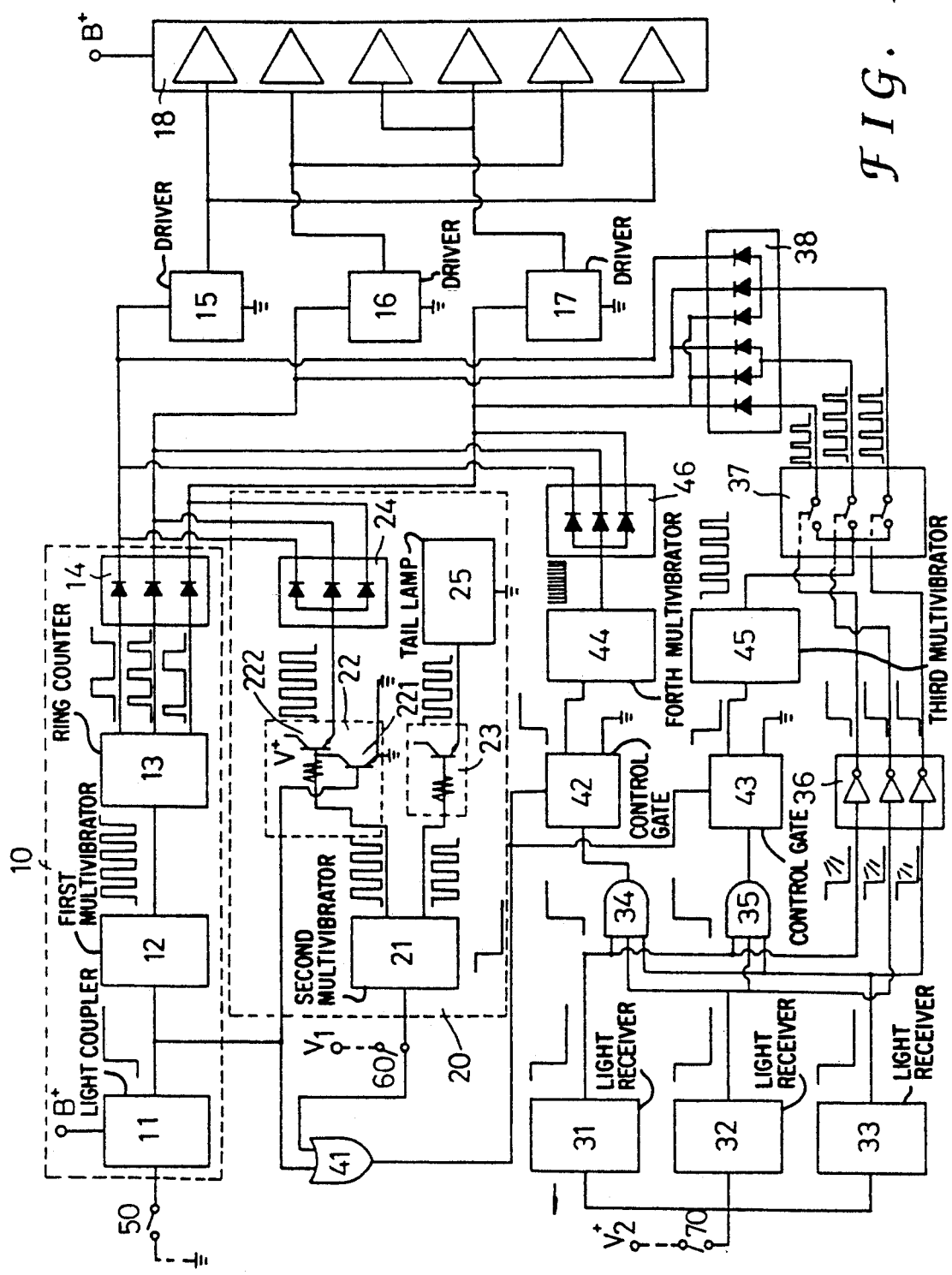

Referring to FIG. 1, the vehicle collision warning circuit of the present invention comprises a door-actuated ring lighting and extinguishing circuit 10, a brake-actuated alternately flashing circuit 20, and a headlight-actuated night distance detection circuit. These systems are actuated by a door switch 50, a brake switch 60 and a headlight switch 70, respectively. Output signals from these three circuits form three groups of signals and, through three groups of transistor drivers 15, 16, and 17 cause an LED display 18 to light and extinguish in different ways for warning purposes.

The LED display 18 has six lamps which group into three display units with each unit consisting of two laterally and symmetrically positioned lamps. These three display units sequentially show three different indications, i.e. progressive lighting and extinguishing in a cyclical manner, flashing, lighting and extinguishing alternately, and flashing, lighting and extinguishing partially when they are actuated under different conditions.

In the door-actuated cyclical lighting and extinguishing circuit 10, an input from the door switch 50 sequentially actuates a first astatic multivibrator 12 through a light coupler 11, causing the multivibrator 12 to generate about 12 Hz of low-frequency multivibrator signals which actuates a ring counter 13 to count cyclically. The ring counter 13 has three counting outputs which sequentially output cyclically at a high level and sequentially actuate the drivers 15, 16 and 17 through a first bank of diodes 14, causing the three groups of display units of LED display 18 to sequentially light or extinguish. When a vehicle door is opened, the door switch 50 of the opened door is shorted and causes the display 18 to light and extinguish cyclically as a warning that the door has been opened.

In the brake-actuated alternately flashing circuit 20, an input from the brake switch 60 actuates a second astatic multivibrator 21, causing the multivibrator 21 to generate about 1.8-2 Hz of two complementary opposed groups of signals and individually sends the signals to two sets of drivers 22, 23, causing the drivers to be "on" and "off" alternately. An output of the driver 22 is connected to the display 18 through a second bank of diodes 24 and then output of the driver 23 is connected to a tail lamp 25. When a brake pedal is actuated, the tail lamp 25 and the display 18 are alternately lighted and extinguished as a warning that the brake pedal of the vehicle has been actuated.

In the event that the brake pedal is actuated while the door is open, a signal from the output of the light coupler 11 is directed to another transistor 221 within the driver 22, driving the transistor 221. Thus, the circuitry is disconnected from the brake-actuated alternately flashing circuit 20 to the display 18. Thus, the display will light and extinguish cyclically and the tail lamp 25 will maintain a flashing mode of operation.

In the headlight-actuated night distance detection circuit there is provided three light receiving circuits 31, 32 and 33 which are actuated by the headlight switch 70. The three light receiving circuits 31, 32 and 33 are capable of detecting the intensity of light at the rear of the vehicle at three grades of sensitivity, namely, high, middle, and low, which generally represent the distance between the vehicle and a rearwardly approaching vehicle with the sensitivity to be 5-7 meters, 3-5 meters, or less than 3 meters, respectively. The detected result causes outputs of these three light receiving circuits 31, 32 and 33 to change from high-level to low-level to show their actuated state. The outputs of these three light receiving circuits 31, 32 and 33 are divided into three branches. The first branch controls a three-unit analog switch 37 through a reverser 36. The second branch supplies a signal source for the three-unit analog switch 37 through an AND gate 35, a control gate 43 and a third astatic multivibrator 45. Three outputs of the analog switch 37 are connected to the three drivers 15, 16 and 17 of the LED display 18 through a third bank of diodes 38, which permits one, two, or all three display units of the LED display 18 to flash in response to a long, middle, or short distance as detected by the light receiving circuits 31, 32 and 33, respectively.

The third branch is also connected to the three drivers 15, 16 and 17 through an AND gate 34, a control gate 42, a fourth astatic multivibrator 44 and a fourth bank of diodes 46. When there is not any rear approaching vehicle, the light receiving circuits 31, 32 and 33 do not receive any signal and therefore produce a high-level output that causes the AND gate 34 to output a high-level signal and actuates the fourth astatic multivibrator 44 to generate about 100 Hz os oscillating signal output, making the three display units of the LED display 18 light since the frequency is higher.

Control inputs of the two control gates 42, 43 are connected to the door-actuated cyclical lighting and extinguishing circuit 10 and the brake-actuated alternately flashing circuit 20, respectively, through an OR gate. When driving at night with the headlight switch on, either acuation of the brake pedal or the opening of a door causes the control gates 42, 43 to disconnect the circuitry shown in the lower portion of the block diagram, allowing the LED display 18 to show the warning indication actuated either by the door switch 50 or by the brake switch 60.

Figure 2:
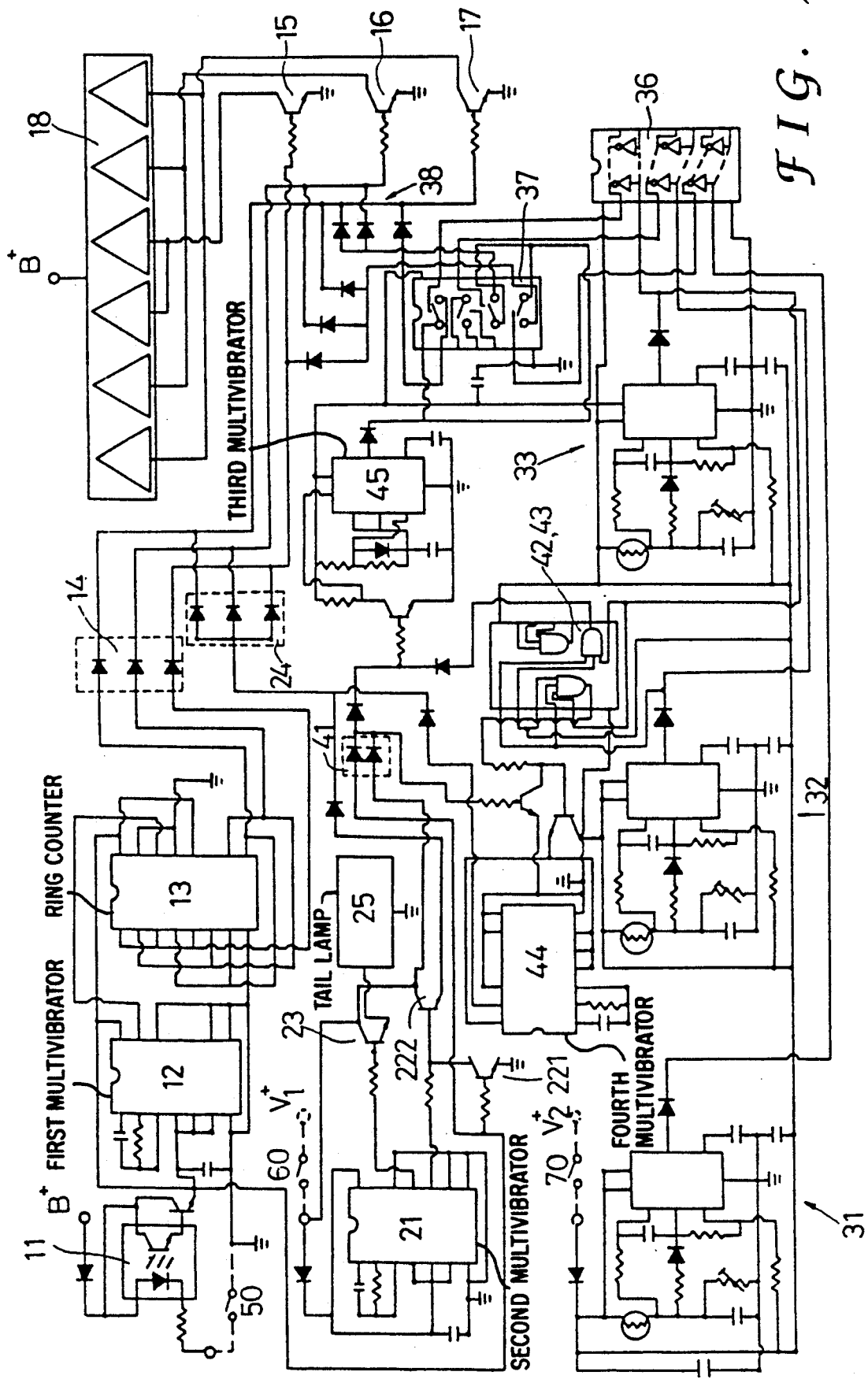
FIG. 2 is a detailed circuit diagram of the present invention.

A more detailed circuit diagram of the present invention is shown in FIG. 2 with the same numeral references as that shown in FIG. 1. In brief, the present invention is a collision warning circuit which causes a tail LED display to light and extinguish cyclically, light and extinguish alternately, or flash as warning indications depending on the door state, brake state of the vehicle, and intensity of light from a rearwardly approaching vehicle at night.

What is claimed is:

1. A collision warning circuit for a vehicle comprising:

(a) a door-actuated cyclical lighting and extinguishing circuit coupled to a door switch of said vehicle, said door-actuated cyclical lighting and extinguishing circuit including a light coupler in series connection with said door switch, a first astatic multivibrator in series connection with said light coupler and a ring counter, said ring counter providing output signals to a fist bank of a plurality of diodes, each of said diodes respectively being coupled to a respective one of a plurality of transistor drivers, said transistor drivers being coupled to an LED display, said LED display comprising three groups of display units, said display units being sequentially and cyclically actuated when said door switch of said vehicle is opened;

(b) a brake-actuated alternately flashing circuit coupled to a brake switch of said vehicle, and a second astatic multivibrator, said second astatic multivibrator outputting a pair of complementary output signals, each of said complementary output signals being input to a respective driver circuit, one said driver circuit being coupled to a tail lamp of said vehicle and the other said driver circuit being coupled to said LED display through a second bank of diodes individually coupled to respective ones of said transistor drivers whereby when said brake switch of said vehicle is actuated said LED display and said tail lamp are alternately actuated;

(c) a headlight actuated night distance detection circuit coupled to a headlight switch of said vehicle, said headlight actuated night distance detection circuit including three light reception circuits individually responsive to a predetermined high, mid-range, and low light intensity level, each of said light reception circuits being series connected to a first and second AND gate and a reverser circuit, said reverser circuit being output coupled to an analog switch circuit, said first AND gate coupled to a third astatic multivibrator for output of third multivibrator signals to said analog switch circuit said analog switch circuit providing input signals to a third bank of diodes coupled to said transistor drivers for signal input to said LED display whereby one of one, two and three said groups of display units of said LED display is actuated responsive to said predetermined light intensity level impinging said three light reception circuits form a rearwardly approaching vehicle, said second AND gate being coupled to a fourth astatic multivibrator, an output of said fourth astatic multivibrator being input to a fourth bank of diodes for outputting a signal to said LED display responsive to light intensity below a sensitivity level of said light reception circuits for providing a constant light actuation of said LED display.

2. The collision warning circuit for vehicles as claimed in claim 1, wherein a first control gate is serially connected between said first AND gate and said fourth astatic multivibrator, a second control gate is serially connected between said second AND gate, and said third astatic multivibrator control inputs of said first and second control gates being separately connected to said door-actuated cyclical lighting and extinguishing circuit and said brake-actuated alternately flashing circuit through an OR gate whereby said headlight-actuated night distance detection circuit is disconnected when one of said door-actuated cyclical lighting and extinguishing circuit and said brake-actuated alternately flashing circuit is actuated.

3. The collision warning circuit for vehicles as claimed in claim 1, wherein said brake-actuated alternately flashing circuit further comprises grounded transistor connected to one of said driver circuits which are used to actuate said LED display, a base of said transistor being connected to said door-actuated cyclical lighting and extinguishing circuit whereby said brake-actuated alternately flashing circuit for controlling said LED display is disconnected when said door-actuated cyclical lighting and extinguishing circuit is actuated simultaneously with actuation of said brake switch of said vehicle, allowing said display units of said LED display to cyclically light and extinguish.

* * * * *